(12) United States Patent
Chang

(10) Patent No.: US 7,699,290 B2
(45) Date of Patent: Apr. 20, 2010

(54) CONNECTION DEVICE FOR QUICKLY CONNECTING PNEUMATIC HOSE

(76) Inventor: Jen-Chih Chang, No. 252, Wuguang Rd., Wurih Township, Taichung County 414 (TW)

( * ) Notice: Subject to any disclaimer, the term of this patent is extended or adjusted under 35 U.S.C. 154(b) by 423 days.

(21) Appl. No.: 11/892,051

(22) Filed: Aug. 20, 2007

(65) Prior Publication Data

US 2009/0050836 A1   Feb. 26, 2009

(51) Int. Cl.
*F16K 51/00* (2006.01)
*F16L 37/28* (2006.01)

(52) U.S. Cl. .............. 251/149.9; 251/149.1; 251/149.6; 285/276; 285/317

(58) Field of Classification Search .............. 251/149.1, 251/149.3, 149.6, 149.9; 285/275, 276, 314, 285/315, 316
See application file for complete search history.

(56) References Cited

U.S. PATENT DOCUMENTS

| | | | | |
|---|---|---|---|---|
| 4,181,150 A | * | 1/1980 | Maldavs | 137/614.06 |
| 5,129,621 A | * | 7/1992 | Maiville et al. | 251/149.9 |
| 5,143,347 A | * | 9/1992 | Lee et al. | 251/149.6 |
| 6,557,824 B1 | * | 5/2003 | Jenski et al. | 251/149.6 |

* cited by examiner

*Primary Examiner*—John K Fristoe, Jr.
(74) *Attorney, Agent, or Firm*—Rosenberg, Klein & Lee

(57) ABSTRACT

A connecting device includes an inner tube having a plurality of elongate holes and a plurality of oval-shaped beads are movably engaged with the elongate holes. A plurality of openings are defined in an inner surface of the inner tube and communicate with the elongate holes respectively. A valve unit is movably located in the inner tube and includes a collar which removably closes the openings. An outer tube is movably mounted to an outer surface of the inner tube. An inlet member is connected to a first end of the inner tube. A part in short axis of each of the beads protrudes beyond the opening of the inner tube so as to provide a larger contact area with the head of hose when the head of hose is inserted into the inner tube to push the collar away from the openings.

11 Claims, 6 Drawing Sheets

CONNECTION DEVICE FOR QUICKLY CONNECTING PNEUMATIC HOSE

FIELD OF THE INVENTION

The present invention relates to a connection device for quickly and securely connecting a connection head of hoses of pneumatic tools.

BACKGROUND OF THE INVENTION

A conventional connection device 9 for quickly connecting hose head 96 is shown in FIGS. 6 and 7, and generally includes an inner tube 91 which includes a top opening and an inlet member 93 is threadedly connected to the bottom of the inner tube 91. The inlet member 93 includes a valve unit 931 located in the inner tube 91. A first spring is connected between the valve unit 931 and the inlet member 93. An outer tube 92 is movably mounted to the inner tube 91 with a second spring 95 connected between the inner tube 91 and the outer tube 92 which is pushed and positioned at a first position by the second spring 95. A plurality of holes 911 are defined through a wall of the inner tube 91 and a bead 94 is movably engaged with each of the hole 911. The beads 94 are pushed inward by moving the outer tube 92 downward from the first position to a second position as shown in FIG. 6. When a head 96 of a hose is inserted into the top opening of the inner tube 91, the outer tube 92 is pulled downward and the valve unit 931 is pushed so that paths are formed to allow air or the like to be introduced via the hose, the inner tube 91 and the inlet member 93. After the head 96 of the hose is inserted into the inner tube 91, the outer tube 92 is released and pushed by the second spring 95 pushes the outer tube 92 upward so that the inside of the outer tube 92 pushes the beads 94 inward to be engaged with a groove in the outer surface of the head 96 to position the head 96. In order to ensure that the part of the head 94 protrudes beyond the opening 912 of the hole 911 so as to be engaged with the groove of the head 96, and to ensure that the bead 94 does not drop from the opening 912 of the hole 911, the diameter "L1" of the bead 94 can only be slightly larger than a width "L2" of the opening 912. The inner surface of the opening 912 is easily worn out by frequent movement of the bead 94, and the spherical bead 94 contacts the head 96 only at one point "P". The point "P" is suffered by huge pressure and is easily worn out. Once the bead 94 and/or the opening 91 are worn, the head 96 is not well positioned. Shaking and leakage become the most concerns of the connection of the head 96 and the connection device 9.

The present invention intends to provide a connection device which includes oval-shaped beads which provide larger contact areas when contacting against the head of hose and the length of the beads is longer than the length of the holes in the inner tube so that the beads are not affected by the wearing.

SUMMARY OF THE INVENTION

The present invention relates to a connecting device which comprises an inner tube with a plurality of elongate holes defined through a wall thereof and a plurality of oval-shaped beads are movably engaged with the elongate holes. Each of the elongate holes includes a long axis which is perpendicular to a longitudinal axis of the inner tube and a short axis which is parallel to the longitudinal axis of the inner tube. Each of the beads includes a long axis and a short axis. A part of each of the beads in the direction of the short axis protrudes beyond an inner surface of the inner tube. An outer tube is movably mounted to an outer surface of the inner tube and an inlet member is connected to a first end of the inner tube. A valve unit is movably located in the inner tube and includes a collar which movably contacts the inner surface of the inner tube and closes the elongate holes.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
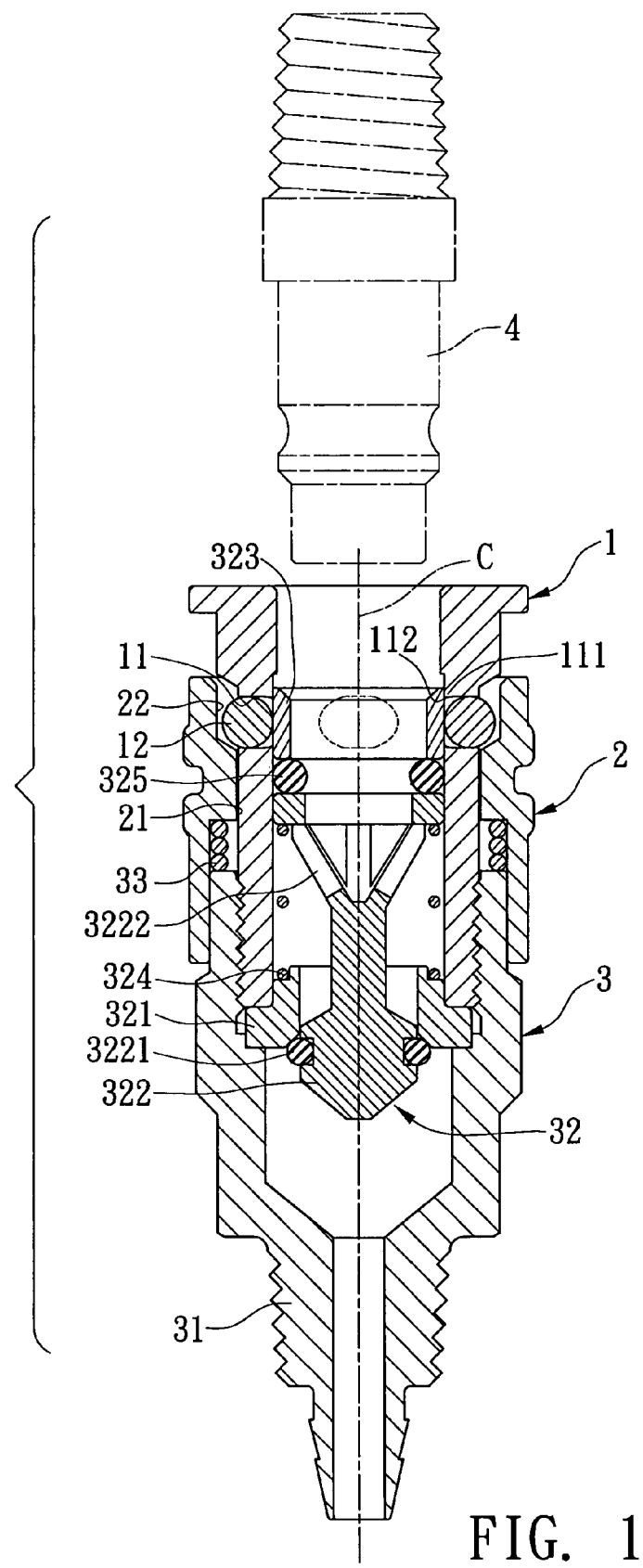
FIG. 1 is a cross sectional view to show the connection device of the present invention.
Figure 2:
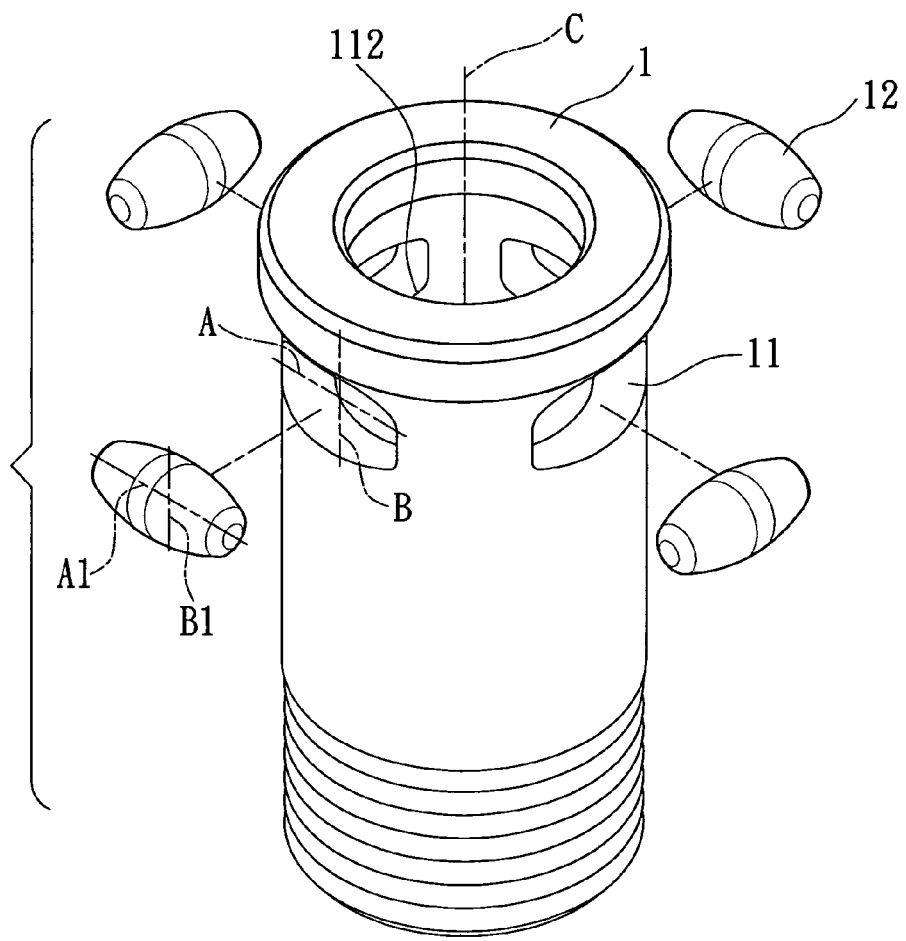
FIG. 2 is an exploded view to show the oval-shaped beads are engaged with the elongate holes in the inner tube.
Figure 3:
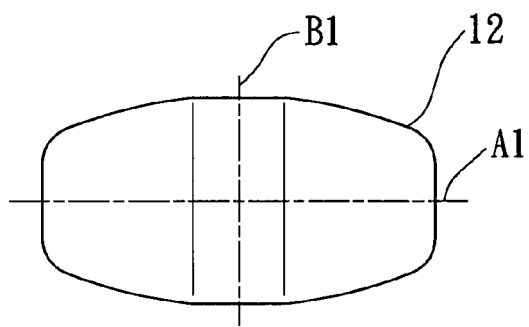
FIG. 3 shows that each bead includes a long axis and a short axis.

Referring to FIGS. 1 to 3, the connection device of the present invention comprises an inner tube 1 having a central path and a plurality of elongate holes 111 are defined through a wall thereof. Each of the elongate holes 111 includes a long axis "A" which is perpendicular to a longitudinal axis "C" of the inner tube 1, and a short axis "B" which is parallel to the longitudinal axis "C" of the inner tube 1. A plurality of openings 112 are defined in an inner surface of the inner tube 1 and communicate with the elongate holes 11 respectively.

Figure 5:
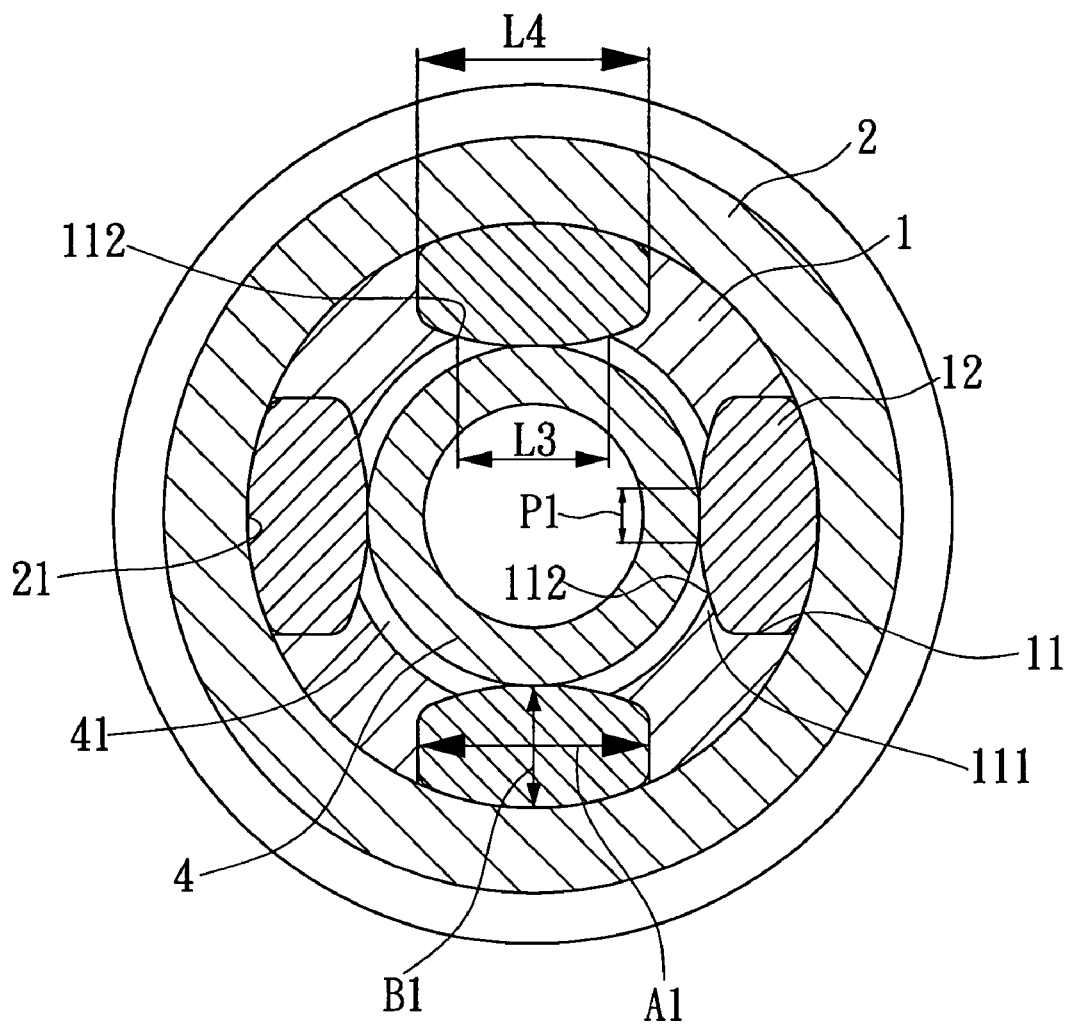
FIG. 5 is a cross sectional view taken along line 5-5 in FIG. 4 to show the relationship between the beads and the elongate holes.
Figure 6:
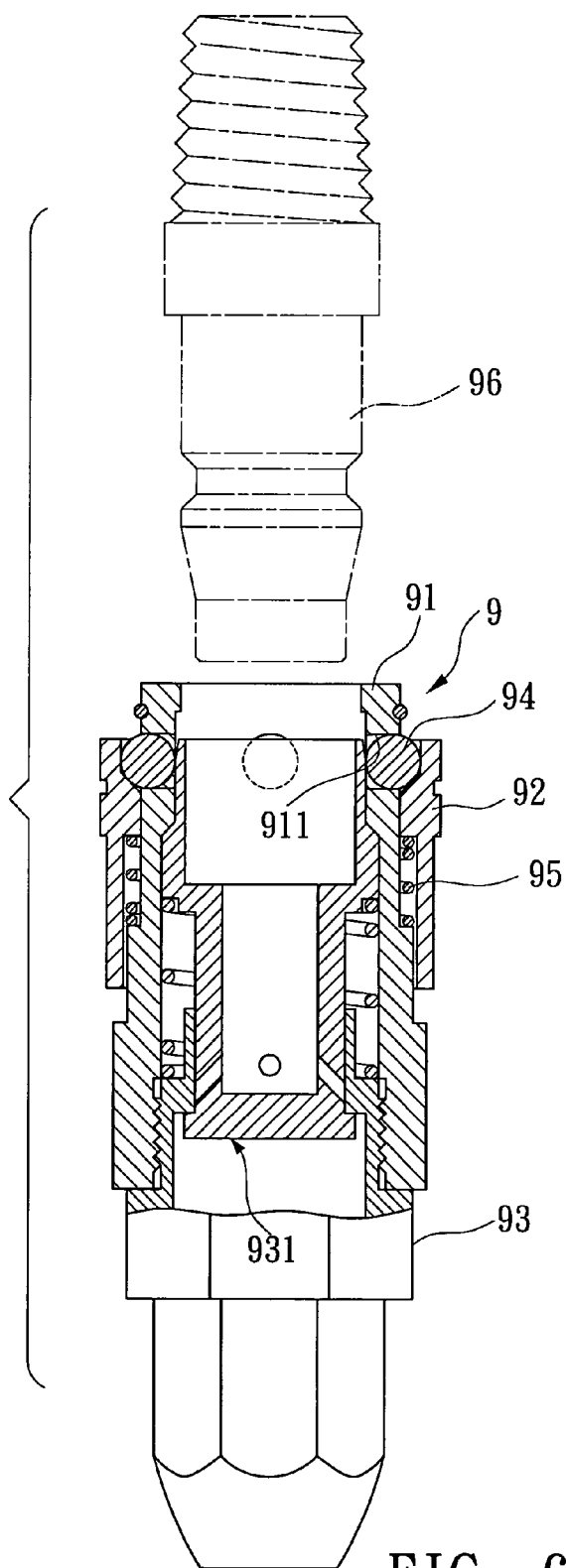
FIG. 6 is a cross sectional view to show a conventional connection device.
Figure 7:
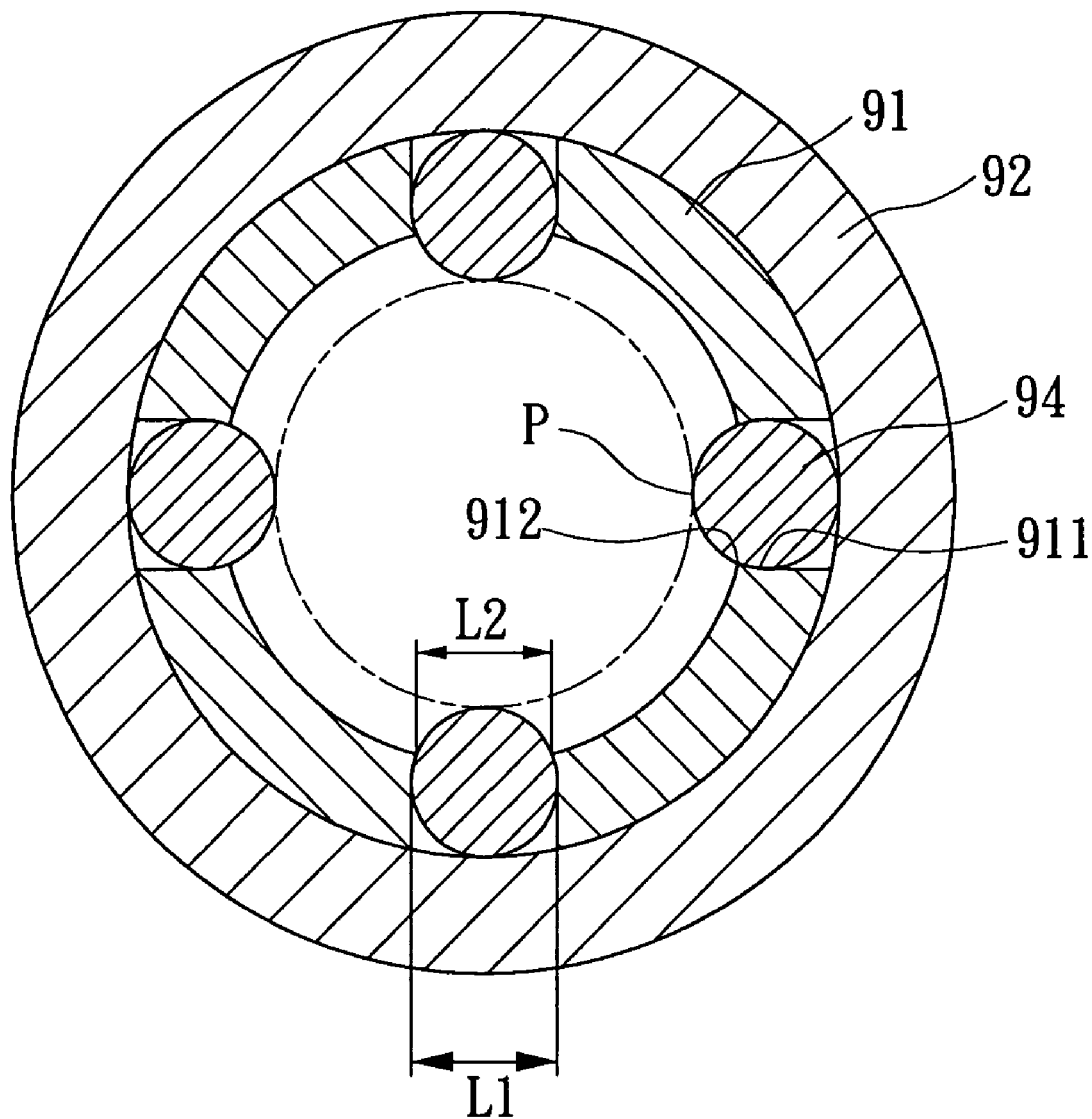
FIG. 7 is a cross sectional view to show the relationship between the beads and the holes of the conventional connection device in FIG. 6.

Further referring to FIG. 5, a plurality of oval-shaped beads 12 are movably engaged with the elongate holes 111. Each of the beads 12 includes a long axis "A1" and a short axis "B1". A length "L4" of each bead 12 is sized such that two rounded ends of each of the beads 12 along the long axis "A1" are received in the elongate hole 111 corresponding thereto. A part of each of the beads 12 in the direction of the short axis "B1" protrudes beyond the opening 112 in the inner surface of the inner tube 1. The part of each of the beads 12 in the direction of the short axis "B1" protruding beyond the inner surface of the inner tube 1 includes a flat contact area. A width "P1" of the flat contact area is shorter than a width "L3" of the opening 112.

Figure 4:
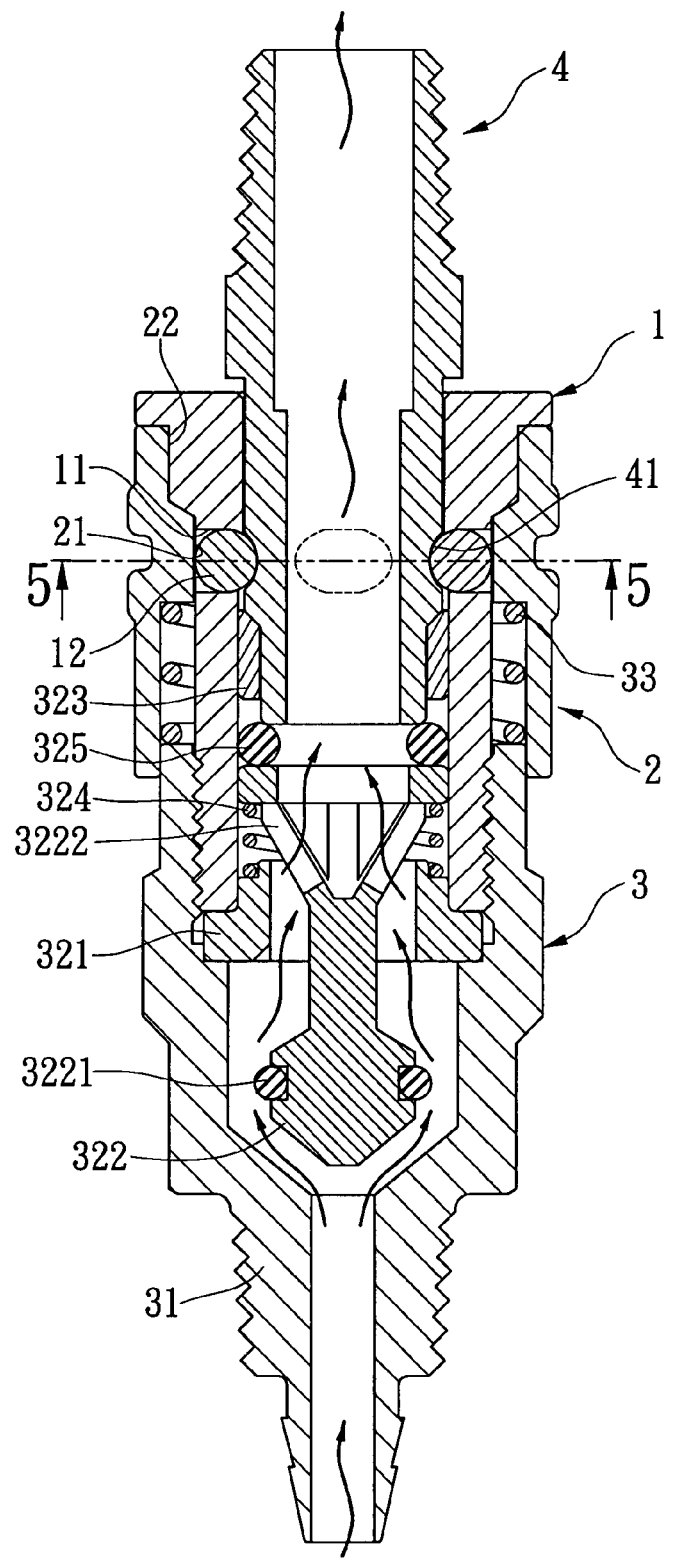
FIG. 4 is a cross sectional view to show that a head of hose is inserted in the inner tube and the valve unit is lowered to communicate the hose and the inlet member.

An outer tube 2 is movably mounted to an outer surface of the inner tube 1 and includes a first surface 21 and a second surface 22 defined in an inner side thereof. The first surface 21 is movably in contact with an outer surface of the inner tube 1 and the second surface 22 is located to define a gap between the second surface 22 and the outer surface of the inner tube 1. The first surface 21 is moved to push the beads 12 inward when the outer tube 2 is located at a first position as shown in FIG. 4, another part of each of the beads 12 is received in the gap when the outer tube 2 is located at a second position as shown in FIG. 1. A first spring 33 is located between a top surface of the inlet member 3 and a stepped surface of the outer tube 2 so as to keep the outer tube 2 at the first position.

An inlet member 3 is threadedly connected to a first end of the inner tube 1 and includes a connection body 31 which is to be connected to a hose (not shown).

A valve unit 32 is movably located in the central path of the inner tube 1 and includes a collar 323 which movably contacts the inner surface of the inner tube 1 and closes the elongate holes 111 so as to push the beads 12 when the outer tube 2 is located at the second position as shown in FIG. 1. A restriction member 321 is fixed to the first end of the inner tube 1 and includes a central passage. The valve unit 32 includes an enlarged head 322 which has a seal ring 3221 mounted thereto and the seal ring 3221 removably seals the central passage of the restriction member 321. A second spring 324 is located between the restriction member 321 and an underside of a top flange of the valve unit 32 so as to keep the valve unit 32 to seal the central passage. A plurality of grooves 3222 are defined in the valve unit 32 and communicate with an inner space of the inner tube 1. Another seal ring 325 is located between the top flange of the valve unit 32 and the collar 323 to further ensure the sealing between the valve unit 32 and the inner surface of the inner tube 1.

As shown in FIG. 4, when a head 4 of hose is inserted into the inner tube 1 from a second end of the inner tube 1, the user pulls the outer tube 2 downward to its second position, the front end of the head 4 of hose pushes the collar 323, the seal ring 325 and the valve unit 32 downward, such that the enlarged head 322 and the seal ring 3221 are removed from the restriction member 321 to allow gas, air or the like to be introduced from the inlet member 3, the gap between the valve unit 3 and the restriction member 321, the grooves 3222, the collar 323 and enters into the head 4 of hose. When the head 4 of hose is inserted into the inner tube 1, the user releases the outer tube 2, the spring 33 pushes the outer tube 2 upward so that the first surface 21 of the outer tube 2 pushes the beads 12 inward and the contact areas of the beads 12 are engaged with a groove in the head 4 of the hose to position the head 4 of hose.

The width "L3" of the opening 112 is much shorter than a length of the elongate hole 11 so that even if wearing happens at the opening 112, the beads 12 are still normally functioned. This feature allows the inner tube 1 to be made by softer material such as plastic. Besides, the flat contact area of each bead 12 provide strong and reliable positioning function to position the head 4 of hose so that the head 4 of hose is in stable status.

While we have shown and described the embodiment in accordance with the present invention, it should be clear to those skilled in the art that further embodiments may be made without departing from the scope of the present invention.

What is claimed is:

1. A connecting device comprising:
   an inner tube having a plurality of elongate holes defined through a wall thereof, a plurality of oval-shaped beads movably engaged with the elongate holes, each of the elongate holes having a long axis which is perpendicular to a longitudinal axis of the inner tube, a short axis of each of the elongate holes being parallel to the longitudinal axis of the inner tube, a plurality of oval-shaped beads movably engaged with the elongate holes, each of the beads having a long axis and a short axis, a part of each of the beads in the direction of the short axis protruding beyond an inner surface of the inner tube;
   an outer tube movably mounted to an outer surface of the inner tube;
   an inlet member connected to a first end of the inner tube, and
   a valve unit movably located in the inner tube and having a collar which movably contacts the inner surface of the inner tube and closes the elongate holes.

2. The device as claimed in claim 1, wherein each of the beads includes two ends located along the long axis thereof and the two ends are received in the elongate hole corresponding thereto.

3. The device as claimed in claim 2, wherein the two ends of each of the beads are rounded ends.

4. The device as claimed in claim 1, wherein the part of each of the beads in the direction of the short axis protruding beyond the inner surface of the inner tube includes a flat contact area.

5. The device as claimed in claim 4, wherein an opening is defined in the inner surface of the inner tube and the part of each of the beads in the direction of the short axis protrudes beyond the opening, a width of the flat contact area is shorter than a width of the opening.

6. The device as claimed in claim 1, wherein the outer tube includes a first surface and a second surface defined in an inner side thereof, the first surface is movably in contact with an outer surface of the inner tube and the second surface is located to define a gap between the second surface and the outer surface of the inner tube, the first surface is moved to push the beads inward when the outer tube is located at a first position, another part of each of the beads is received in the gap when the outer tube is located at a second position.

7. The device as claimed in claim 1, wherein a restriction member is fixed to the first end of the inner tube and includes a central passage, the valve unit includes an enlarged head which has a seal ring mounted thereto, the seal ring removably seals the central passage of the restriction member.

8. The device as claimed in claim 7, wherein a second spring is located between the restriction member and an underside of a top flange of the valve unit.

9. The device as claimed in claim 8, wherein another seal ring is located between the top flange of the valve unit and the collar.

10. The device as claimed in claim 7, wherein a plurality of grooves are defined in the valve unit and communicate with an inner space of the inner tube.

11. The device as claimed in claim 1, wherein a first spring is located between a top surface of the inlet member and a stepped surface of the outer tube.

\* \* \* \* \*